US012683089B2

(12) United States Patent
Aoyama et al.

(10) Patent No.: US 12,683,089 B2
(45) Date of Patent: Jul. 14, 2026

(54) ELECTRODE FOIL WITH EDGE REGION THICKNESS VARIATION FOR IMPROVED ELECTROLYTIC CAPACITOR RELIABILITY

(71) Applicant: Panasonic Intellectual Property Management Co., Ltd., Osaka (JP)

(72) Inventors: Tatsuji Aoyama, Kyoto Fu (JP); Shumpei Matsushita, Yamaguchi Ken (JP); Tomoyuki Tashiro, Yamaguchi Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 116 days.

(21) Appl. No.: 18/712,152

(22) PCT Filed: Nov. 29, 2022

(86) PCT No.: PCT/JP2022/044008
§ 371 (c)(1),
(2) Date: May 21, 2024

(87) PCT Pub. No.: WO2023/100888
PCT Pub. Date: Jun. 8, 2023

(65) Prior Publication Data
US 2025/0022664 A1      Jan. 16, 2025

(30) Foreign Application Priority Data
Nov. 30, 2021      (JP) ................................. 2021-194887

(51) Int. Cl.
*H01G 9/055*      (2006.01)
*H01G 9/048*      (2006.01)
(Continued)

(52) U.S. Cl.
CPC ............. *H01G 9/055* (2013.01); *H01G 9/048* (2013.01); *H01G 9/151* (2013.01); *H01G 9/0425* (2013.01); *H01G 9/145* (2013.01)

(58) Field of Classification Search
None
See application file for complete search history.

(56) References Cited

U.S. PATENT DOCUMENTS 3,854,196 A * 12/1974 Derrick .................. H01G 4/232
                                                              29/25.03
5,968,210 A * 10/1999 Strange ................... H01G 9/00
                                                              29/25.03
(Continued)

FOREIGN PATENT DOCUMENTS

JP      H01-251605 A      10/1989
JP      2008-166315 A      7/2008
(Continued)

OTHER PUBLICATIONS

International Search Report dated Feb. 14, 2023 issued in International Patent Application No. PCT/JP2022/044008, with English translation.

*Primary Examiner* — Eric W Thomas
(74) *Attorney, Agent, or Firm* — Rimon P.C.

(57) ABSTRACT

An electrode foil for an electrolytic capacitor includes a metal foil having a first region and a second region other than the first region, in which the second region is a region extending linearly along an edge portion of the metal foil, the thickness of the second region is smaller than the thickness of the first region, and steps are provided between the first region and the second region on both surfaces of the metal foil.

13 Claims, 11 Drawing Sheets

(51) Int. Cl.
    *H01G 9/15*           (2006.01)
    *H01G 9/042*        (2006.01)
    *H01G 9/145*        (2006.01)

(56)                References Cited

U.S. PATENT DOCUMENTS

| | | | |
|---|---|---|---|
| 6,243,256 B1 * | 6/2001 | Furuta ................... | H01G 9/055 |
| | | | 29/25.03 |
| 6,320,742 B1 * | 11/2001 | Wada .................... | H01G 11/56 |
| | | | 29/25.03 |
| 2011/0149477 A1 * | 6/2011 | Summey ................. | H01G 9/15 |
| | | | 29/25.41 |
| 2016/0329158 A1 | 11/2016 | Hattori et al. | |

FOREIGN PATENT DOCUMENTS

| | | | |
|---|---|---|---|
| JP | 2014-022707 A | 2/2014 | |
| JP | 2017-168740 A | 9/2017 | |
| WO | 2015/118901 A1 | 8/2015 | |

* cited by examiner

ELECTRODE FOIL WITH EDGE REGION THICKNESS VARIATION FOR IMPROVED ELECTROLYTIC CAPACITOR RELIABILITY

CROSS-REFERENCE OF RELATED APPLICATIONS

This application is the U.S. National Phase under 35 U.S.C. § 371 of International Patent Application No. PCT/JP2022/044008, filed on Nov. 29, 2022, which in turn claims the benefit of Japanese Patent Application No. 2021-194887, filed on Nov. 30, 2021, the entire disclosures of which Applications are incorporated by reference herein.

TECHNICAL FIELD

The present disclosure relates to an electrode foil for an electrolytic capacitor, an electrolytic capacitor, and a method for manufacturing an electrolytic capacitor.

BACKGROUND ART

An electrolytic capacitor includes, for example, a wound body. The wound body is obtained by winding together a band-shaped anode foil, a band-shaped cathode foil arranged opposite to the anode foil, and a separator arranged between the anode foil and the cathode foil (e.g., PTL 1).

CITATION LIST

Patent Literature

PTL 1: Japanese Laid-Open Patent Publication No. 2017-168740

SUMMARY OF INVENTION

Technical Problem

An electrode foil is usually cut to a predetermined size and used, and burrs are likely to occur during cutting of the electrode foil. When an electrode foil having burrs is used, the reliability of an electrolytic capacitor is reduced. For example, in an electrolytic capacitor provided with a wound body, burrs may break through a separator, resulting in short circuit failure.

Solution to Problem

An aspect of the present disclosure relates to an electrode foil for an electrolytic capacitor including a metal foil having a first region and a second region other than the first region, in which the second region is a region extending linearly along an edge portion of the metal foil, the thickness of the second region is smaller than the thickness of the first region, and steps are provided between the first region and the second region on both surfaces of the metal foil.

Another aspect of the present disclosure relates to an electrolytic capacitor including a wound capacitor element, in which the capacitor element includes a wound body obtained by winding together a band-shaped anode foil, a band-shaped cathode foil, and a separator arranged between the anode foil and the cathode foil, at least one of the anode foil and the cathode foil includes a band-shaped metal foil having a first region and a second region other than the first region, the metal foil includes a first edge portion extending in a length direction of the metal foil and a second edge portion that is opposite to the first edge portion, the second region is at least one of a 2A region extending linearly along the first edge portion and a 2B region extending linearly along the second edge portion, the thickness of the second region is smaller than the thickness of the first region, and steps are provided between the first region and the second region on both surfaces of the metal foil.

Yet another aspect of the present disclosure relates to an electrolytic capacitor including a stack in which a plurality of stacked capacitor elements are stacked, in which the capacitor elements each include: a metal foil having a cathode forming portion, an anode extraction portion extending from one edge portion of the cathode forming portion, and a porous portion on a surface of the metal foil; a dielectric layer covering the cathode forming portion; and a cathode portion covering the dielectric portion, the cathode forming portion includes a first region and a second region other than the first region, the second region is a region extending linearly along another edge portion of the cathode forming portion other than the one edge portion, the thickness of the second region is smaller than the thickness of the first region, and steps are provided between the first region and the second region on both surfaces of the metal foil.

Yet another aspect of the present disclosure relates to a method for manufacturing an electrolytic capacitor, including: a first step of preparing a metal base sheet having a plurality of first regions and a plurality of cutting regions alternately in stripes: a second step of compressing the cutting regions in a thickness direction of the metal base sheet; and a third step of obtaining a plurality of electrode foils by cutting central portions of the cutting regions in a width direction of the cutting regions, along the length direction of the cutting regions.

Advantageous Effects of Invention

According to the present disclosure, it is possible to suppress a decrease in reliability of an electrolytic capacitor.

While novel features of the present invention are set forth particularly in the appended claims, the present invention, both as to organization and content, will be better understood and appreciated, along with other objects and features thereof, from the following detailed description taken in conjunction with the drawings.

DESCRIPTION OF EMBODIMENTS

Figure 1:
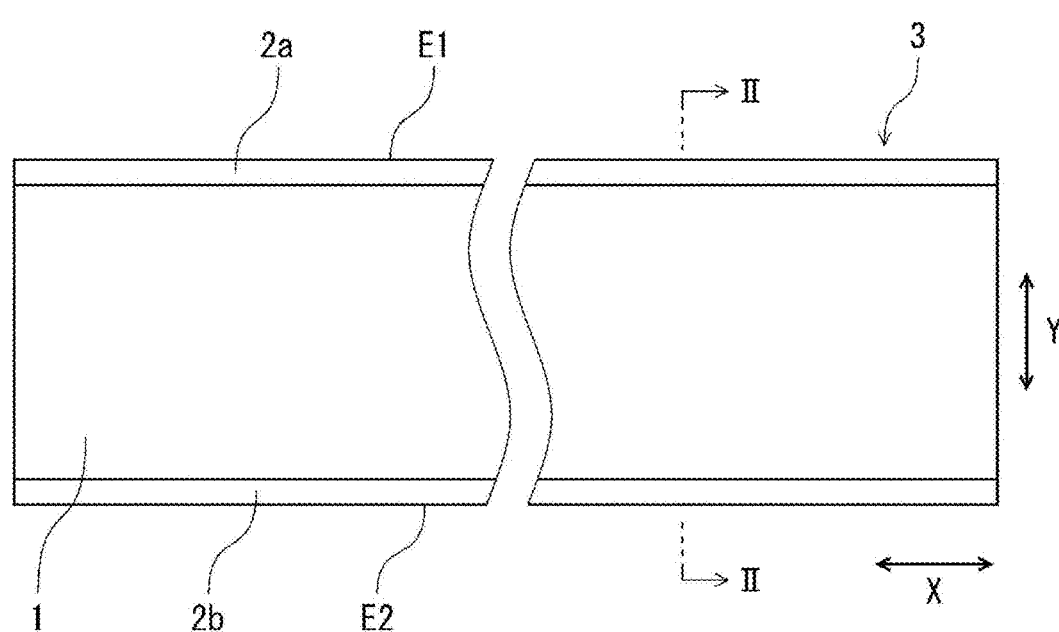
FIG. 1 A front view schematically showing an electrode foil for an electrolytic capacitor according to an embodiment of the present disclosure.

Although an embodiment according to the present disclosure will be described below using an example, the present disclosure is not limited to the example described below. Although specific numerical values and materials may be mentioned as examples in the following description, other numerical values and other materials may be used as long as effects of the present disclosure can be obtained. The term "range from numerical value A to numerical value B" used in this specification includes the numerical value A and the numerical value B, and can be read as "range of numerical value A or more and numerical value B or less". In the following description, when lower limits and upper limits of numerical values regarding specific physical properties or conditions are given as examples, any of the above-mentioned lower limits and any of the above-mentioned upper limits can be combined, as long as the lower limit is not greater than or equal to the upper limit. When a plurality of materials are described as examples, it is possible to use a single material selected therefrom or a combination of two or more materials selected therefrom.

[Electrode Foil for Electrolytic Capacitor]

An electrode foil for an electrolytic capacitor according to an embodiment of the present disclosure includes a metal foil having a first region and a second region other than the first region. The second region is a narrow strip-shape region that extends linearly along an edge portion of the metal foil. The thickness of the second region is smaller than the thickness of the first region, and steps are provided between the first region and the second region on both surfaces of the metal foil. The first region may be band-shaped.

The electrode foil (metal foil) can be obtained by cutting a metal base sheet to a predetermined size. At this time, burrs form at an edge portion of the electrode foil, which is a cutting portion. By providing the second region at the edge portion of the electrode foil, it is possible to ensure a long distance between the edge portion of the electrode foil and a member adjacent to the electrode foil (a member that may cause short circuiting due to contact with the electrode foil) when forming a capacitor element. Accordingly, even when burrs are present at the edge portion of the electrode foil, it is possible to ensure insulation between the electrode foil and the member. As a result, it is possible to suppress an increase in leakage current and short circuit failure caused by burrs, thus improving the reliability of an electrolytic capacitor.

When an electrolytic capacitor includes a wound body, the electrode foil according to the present disclosure may be used as at least one of the anode foil and the cathode foil. As a result, a long distance between edge portions of the anode foil and the cathode foil can be ensured, damage to the separator due to burrs can be suppressed, and insulation between the anode foil and the cathode foil can be ensured. Also, it is possible to ensure a distance that is greater than or equal to the thickness of the separator between the edge portions of the anode foil and the cathode foil when forming a wound body, and to suppress an increase in leakage current and the occurrence of short circuit failure even when winding deviation or winding tightness occurs. Note that winding tightness is a phenomenon in which a separator is compressed by tensile stress generated during winding, and the distance between two electrode foils is reduced. Although the width of the separator is larger than the width of the electrode foils in order to prevent contact between two electrode foils due to winding deviation, use of an electrode foil according to the present disclosure is advantageous in terms of increasing capacity because the width of a separator can be made narrower, and a larger width of the electrode foil can also be ensured.

When the electrode foil is viewed from the normal direction of a main surface thereof, the ratio of an area S2 of the second region to an area S1 of the first region: S2/S1 may be, for example, 0.01 or more (or 0.05 or more) and 3.0 or less, 0.01 or more (or 0.05 or more) and less than 1.0, or 0.01 or more (or 0.05 or more) and 0.75 or less (or 0.5 or less). Note that the main surface of the electrode foil refers to the "surface of the first region". The width of the second region is, for example, 0.1 mm or more and 10 mm or less (or 7 mm or less). When the second region is formed by pressing a metal foil and later-described T2/T1 is small (high degree of compression), the impregnating ability of a conductive polymer is likely to decrease in the second region, and thus the area S2 of the second region (the width of the second region) is desirably small in order to reduce the influence of the decrease thereof on the performance of the electrolytic capacitor.

The second region is formed by, for example, pressing the edge portion of the metal foil in the thickness direction of the metal foil. Pressing is performed by, for example, roll pressing the edge portion of the metal foil. In this case, the portion of the metal foil that is not pressed will be the first region. Later-described T2/T1 can be controlled by press pressure.

The ratio of a thickness T2 of the second region to a thickness T1 of the first region: T2/T1 is preferably 0.60 or more and 0.95 or less, and more preferably 0.70 or more and 0.90 or less. If press pressure is adjusted such that T2/T1 is within a range of 0.60 or more and 0.95 or less when forming the second region by pressing the edge portion of the metal foil having a dielectric layer (or a coating layer) on its surface, exposure of the metal structure of the metal foil is suppressed at the step between the first region and the second region, and the step is also easily covered with the dielectric layer (or coating layer).

When the metal foil is band-shaped, the edge portion of the metal foil includes a first edge portion extending in the length direction of the metal foil and a second edge portion that is opposite to the first edge portion. In this case, the second region is preferably at least one of a 2A region extending linearly along the first edge portion and a 2B region extending linearly along the second edge portion. The band-shaped electrode foil is formed through slitting, and burrs may be present at the first edge portion and the second edge portion. Therefore, short circuit failure and the like of the electrolytic capacitor can be efficiently suppressed by using at least one (preferably both) of the 2A region and the 2B region as the second region. When the second region is formed by the 2A region and the 2B region, the 2A region and the 2B region may have the same width and the same thickness, or different widths and different thicknesses.

The metal foil contains, for example, a valve action metal such as aluminum, tantalum, niobium, or titanium. The metal foil may contain the valve action metal as an alloy or a compound containing the valve action metal.

The metal foil may be a plain foil. Also, the metal foil may be a foil having a roughened surface (etched foil), and may have porous portions on surfaces of the first region and the second region. The metal foil having a roughened surface has porous portions and a core portion that is continuous with a porous portion, and the porous portion and the core portion may be formed as a single piece. The porous portion is formed by etching the surface of the metal foil, and a portion of the metal foil that is not etched remains as a core portion. The thickness of the porous portion (the thickness on each side of the metal foil) is, for example, $1/10$ or more and $4/10$ or less of the total thickness of the metal foil. The porous portion has a large number of pits (or pores) surrounded by a metal portion. The most frequent pore diameter of the porous portion is, for example, 0.10 μm or more and 1.0 μm or less. Note that the "most frequent pore diameter" in this specification refers to the most frequent pore diameter (mode diameter) of a volume-based pore diameter distribution measured using a mercury porosimeter.

The most frequent pore diameter of the porous portion in the second region is preferably smaller than that of the porous portion in the first region. In this case, the impregnating ability of the conductive polymer in the second region is poorer than that in the first region, which is advantageous in terms of suppressing short circuit failure and the like caused by burrs at an edge portion of the metal foil. Also, when the electrode foil having the second region containing a conductive polymer having poor impregnating ability is used as at least one of the anode foil and the cathode foil in the wound body, it is possible to suppress the occurrence of short circuit failure between edge portions of the anode foil and the cathode foil via a conductive polymer due to winding deviation during formation of the wound body.

The ratio of the most frequent pore diameter P2 of the porous portion in the second region to the most frequent pore diameter P1 of the porous portion in the first region: P2/P1 is, for example, 0.3 or more and 0.8 or less (or 0.4 or more and 0.7 or less). It is sufficient that the most frequent pore diameters P1 and P2 are determined by dividing the electrode foil into the first region and the second region and measuring pore diameters for these regions using a mercury porosimeter.

The pit perimeter of the porous portion in the second region may be smaller than that of the porous portion in the first region. The "pit perimeter" refers to the total length of the contours of the inner walls of pits included per unit area of a cross section in the thickness direction of the electrode foil (porous portion). When the second region is formed through pressing, the second region tends to have a larger pit perimeter and a smaller pit diameter than the first region. The ratio of the pit perimeter L2 of the porous portion in the second region to the pit perimeter L1 of the porous portion in the first region: L2/L1 is, for example, 0.70 or more and 0.97 or less (or 0.75 or more and 0.98 or less).

The pit perimeter is determined using the following method.

A cross-sectional image of the electrode foil (porous portion) in the thickness direction is obtained using a scanning electron microscope (SEM) or a transmission electron microscope (TEM). Any five regions (the area S: 50 μm² to 100 μm²) are selected within a range from the outer surface of the porous portion to a depth of $1/3$ of the thickness of the porous portion, using the cross-sectional image of the porous portion in the first region. A total length L of the contours of the inner walls of pits in each region is determined, and a value (L/S) obtained by dividing the length L by the area S of the region is determined as the pit perimeter (μm/μm²) of the porous portion in the first region. The average of the pit perimeters of the five regions is determined. The pit perimeter of the porous portion in the second region is also determined in the same manner. The porous portion in the second region may be thinner than the porous portion in the first region. The thickness of the porous portion in the second region can be smaller than the thickness of the porous portion in the first region when forming the second region by pressing the edge portion of the metal foil (etched foil) having porous portions on its surface. The ratio of a thickness TP2 of the porous portion in the second region to a thickness TP1 of the porous portion in the first region: TP2/TP1 is, for example, 0.60 or more and 0.95 or less (or 0.70 or more and 0.90 or less).

The thickness TP1 (or the thickness TP2) of the porous portion in the first region (or the second region) can be determined by measuring the thicknesses at any ten points on a cross section in the thickness direction of the electrode foil (the porous portion) in the first region (or the second region), and calculating the average of the thicknesses.

The electrode foil may include the metal foil having porous portions on surfaces of the first region and the second region, and a dielectric layer covering the surface of the porous portions. Hereinafter, such an electrode foil is also referred to as a "first electrode foil". The first electrode foil can be used as the anode foil (or the anode body). The dielectric layer is formed by performing, for example, chemical conversion treatment (anodization) on the etched foil. The dielectric layer contains an oxide of a valve action metal (e.g., an aluminum oxide). The dielectric layer is formed along the uneven surface of a porous portion, and is formed to cover the inner wall surface of the pits (or pores) of the porous portion. The dielectric layer has a thickness of, for example, 5 nm or more and 300 nm or less.

In the first electrode foil, the most frequent pore diameter of the porous portion in the second region is preferably smaller than that of the porous portion in the first region, or the porous portion in the second region may be thinner than the porous portion in the first region. In this case, the impregnating ability of the conductive polymer in the second region is poorer than that in the first region, which is advantageous in terms of suppressing short circuit failure and the like caused by burrs at an edge portion of the metal foil. Also, in this case, the impregnating ability of the conductive polymer is poor in the second region, contact between a defective portion of the dielectric layer and the conductive polymer is suppressed, and an increase in leakage current due to the contact is suppressed.

The dielectric layer thinly covers the surfaces of the porous portions in the first region and the second region. Therefore, it can be said that, in the first electrode foil having a dielectric layer on its surface, the ratio of the most frequent pore diameter PD2 of the porous portion in the second region to the most frequent pore diameter PD1 of the porous portion in the first region: PD2/PD1 is substantially equivalent to the above P2/P1.

The first electrode foil is produced by, for example, forming a porous portion on the surface of the metal foil, forming a dielectric layer covering the surface of the porous portion, and then forming the second region by pressing the metal foil along the edge portion. In this case, the most frequent pore diameter of the porous portion in the second region is smaller than that of the porous portion in the first region, and the thickness of the porous portion in the second region can be smaller than that in the first region.

The electrode foil may include the metal foil (a plain foil or an etched foil), and a coating layer covering the surfaces of the first region and the second region of the metal foil. The coating layer may include at least one selected from the group consisting of a metal oxide layer, a metal nitride layer, a metal carbide layer, and a conductive layer. Hereinafter, such an electrode foil is also referred to as a "second electrode foil". The second electrode foil can be used as the cathode foil. The coating layer is formed for the purpose of increasing corrosion resistance, conductivity, and the like. Examples of metals contained in the coating layer include titanium, nickel, tantalum, and niobium. The metal contained in the coating layer may be the same as or different from the metal contained in the metal foil. The coating layer has a thickness of, for example, 10 nm or more and 5000 nm or less. The conductive layer may be a metal layer and/or a carbon layer. Also, carbon particles may be dispersed in the metal oxide layer, the metal nitride layer, or the conductive layer. The coating layer may be constituted of, for example, the metal oxide layer, the metal nitride layer, and/or the metal layer, and a carbon layer.

The second electrode foil is produced by, for example, forming the coating layer on the surface of the metal foil (a plain foil or an etched foil), and then forming the second region by pressing the edge portion of the metal foil.

Figure 2:
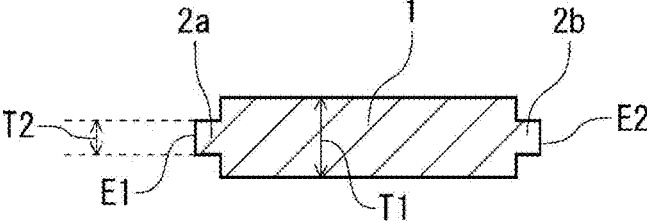
FIG. 2 A cross-sectional view schematically showing an electrode foil for an electrolytic capacitor according to an embodiment of the present disclosure.

Here, FIG. 1 is a front view schematically showing an electrode foil for an electrolytic capacitor according to an embodiment of the present disclosure. FIG. 2 is a cross-sectional view schematically showing an electrode foil for an electrolytic capacitor according to an embodiment of the present disclosure. The X-direction and the Y-direction in FIG. 1 respectively indicate the length direction and the width direction of the band-shaped electrode foil.

The band-shaped electrode foil 3 has a first edge portion E1, and a second edge portion E2 that is opposite to the first edge portion E1. The first edge portion E1 and the second edge portion E2 are edge portions each extending in the X-direction. The electrode foil 3 has a first region 1, a 2A region 2a extending linearly along the first edge portion E1, and a 2B region 2b extending linearly along the second edge portion E2. The first region 1 has a thickness T1. The 2A region 2a has a thickness T2. The 2B region 2b also has a thickness T2 that is substantially the same as that of the 2A region 2a. The thickness T2 of the 2A region 2a and the 2B region 2b is smaller than the thickness T1 of the first region 1. Steps are provided between the first region 1 and the 2A region 2a and between the first region 1 and the 2B region 2b on both surfaces of the metal foil 3. The electrode foil 3 may be the first electrode foil or the second electrode foil.

The ratio of a length LW2 in the Y-direction of the 2A region 2a (the 2B region 2b) to a length LW1 in the Y-direction of the first region 1: LW2/LW1 may be, for example, 0.01 or more (or 0.05 or more) and 3.0 or less, or 0.01 or more (or 0.05 or more) and less than 1.0. The length LW2 in the Y-direction of the 2A region 2a (the 2B region 2b) is, for example, 0.1 mm or more and 10 mm or less (or 7 mm or less).

In FIGS. 1 and 2, the 2A region 2a and the 2B region 2b have the same thickness and the same width, but may have different thicknesses and/or different widths.

[Electrolytic Capacitor]

An electrolytic capacitor according to an embodiment of the present disclosure includes a wound capacitor element. The capacitor element includes a wound body obtained by winding together a band-shaped anode foil, a band-shaped cathode foil arranged opposite to the anode foil, and a separator arranged between the anode foil and the cathode foil. At least one of the anode foil and the cathode foil includes a band-shaped metal foil having a first region and a second region other than the first region. The metal foil includes a first edge portion extending in the length direction of the metal foil and a second edge portion that is opposite to the first edge portion, and the second region is at least one of the 2A region extending linearly along the first edge portion and the 2B region extending linearly along the second edge portion. The thickness of the second region is smaller than the thickness of the first region, and steps are provided between the first region and the second region on both surfaces of the metal foil.

The wound capacitor element may further include an electrolyte adhering to the wound body. The electrolyte is distributed to cover the dielectric layer, and is interposed between the anode foil and the cathode foil. The wound capacitor element may contain a conductive polymer (solid electrolyte) covering the dielectric layer. In this case, it is preferable that the coverage of the inner walls of the pits in the porous portion with the conductive polymer in the second region is smaller than that in the first region (the impregnating ability of the conductive polymer is poor), and the second region need not be covered by the conductive polymer. When a conductive polymer is not adhered to the second region, it is desirable that the area of the second region is small.

If the second region is formed by pressing the metal foil and T2/T1 is comparatively large (e.g., T2/T1 is larger than 0.70), the influence of pressing on the impregnating ability of the conductive polymer in the second region is reduced, and even if the area S2 of the second region is relatively large (e.g., compared to the first region), there is almost no influence on the performance of the electrolytic capacitor, such as the capacity. However, when T2/T1 is small (e.g., T2/T1 is 0.70 or less), pressing will have greater influence on the impregnating ability of the conductive polymer in the second region, and thus the area S2 of the second region is preferably smaller than the area of the first region. The ratio of the area S2 of the second region to the area S1 of the first region: S2/S1 is, for example, more preferably 0.75 or less (or 0.5 or less). In this case, it is possible to reduce the influence on the performance of the electrolytic capacitor.

As a method for covering the surface of the dielectric layer with a conductive polymer, the wound body may be impregnated with a treatment liquid containing the conductive polymer (a solution or dispersion of the conductive polymer), or a treatment liquid containing a conductive polymer may be applied to the surface of the electrode foil (the anode foil and/or the cathode foil) before being formed into the wound body. When the electrode foil has the first region and the second region, the treatment liquid containing the conductive polymer may be applied only to the first region. Also, the amount of the conductive polymer adhered to the second region (the porous portion) may be reduced using, as the treatment liquid, a dispersion product containing conductive polymer particles having a diameter larger than the pit diameter of the porous portion in the second region.

(Anode Foil)

The anode foil includes: the metal foil containing a valve action metal and having a porous portion and a core portion that is continuous with the porous portion; and a dielectric layer covering the surface of the porous portion. The anode foil has a thickness of, for example, 60 μm or more and 200 μm or less.

The anode foil is a first electrode foil having the first region and the second region, and the most frequent pore diameter of the porous portion in the second region is preferably smaller than the most frequent pore diameter of the porous portion in the first region. In this case, the coverage of the inner walls of the pits in the porous portion with the conductive polymer in the second region can be made smaller than that in the first region. The ratio of a coverage C2 of the porous portion with the conductive polymer in the second region to a coverage C1 of the porous portion with the conductive polymer in the first region: C2/C1 is, for example, 0.10 or more and 0.95 or less (or 0.20 or more and 0.90 or less).

The coverage of the porous portion with the conductive polymer is determined using the following method.

A cross-sectional image of the electrode foil (porous portion) in the thickness direction is obtained using a SEM or a TEM. Any five regions (the area S: 50 $\mu m^2$ to 100 $\mu m^2$) are selected within a range from the outer surface of the porous portion to a depth of ⅓ of the thickness of the porous portion, using the cross-sectional image of the porous portion in the first region. A total length L0 of the contour of the inner walls of pits in each region, and a length L1 of the contour of portions of the inner walls of the pits covered with the conductive polymer are determined, and a ratio (percentage) of L1 to L0 is determined as the coverage. The average of the coverages of the five regions is determined. The second region is also determined in the same manner.
(Cathode Foil)

A metal foil containing a valve action metal can be used as the cathode foil. Although a plain foil is used as the metal foil, an etched foil may be used as needed. The cathode foil is preferably the above-mentioned electrode foil, and may be the second electrode foil. The cathode foil has a thickness of, for example, 20 $\mu m$ or more and 60 $\mu m$ or less.
(Separator)

There is no particular limitation on the separator. For example, it is possible to use nonwoven cloth containing fibers made of cellulose, polyethylene terephthalate, vinylon, or polyamide (e.g., aliphatic polyamide or aromatic polyamide such as aramid).
(Electrolyte)

The electrolyte covers at least a portion of the anode foil (the dielectric layer), and is interposed between the anode foil (the dielectric layer) and the cathode foil. The electrolyte includes at least one of a solid electrolyte and an electrolyte solution. The solid electrolyte and an electrolyte solution or a nonaqueous solvent may be used together. Hereinafter, an electrolyte solution and a nonaqueous solvent will also be collectively referred to as a "liquid component".

The solid electrolyte contains a conductive polymer, and may also contain a dopant together with a conductive polymer. The conductive polymer is a π-conjugated polymer, for example. Examples of the conductive polymer include polypyrrole, polythiophene, and polyaniline, and derivatives thereof. Examples of derivatives of polythiophene include poly(3,4-ethylenedioxythiophene). Examples of the dopant include polystyrene sulfonic acid. The conductive polymers and dopants may be used alone or in combination of two or more.

The electrolyte solution contains a nonaqueous solvent and a solute (e.g., an organic salt) dissolved in the nonaqueous solvent. The nonaqueous solvent may be an organic solvent or an ionic liquid.

A solvent that has a high boiling point is preferably used as the nonaqueous solvent. For example, it is possible to use polyol compounds such as ethylene glycol, sulfone compounds such as sulfolane, lactone compounds such as γ-butyrolactone, ester compounds such as methyl acetate, carbonate compounds such as propylene carbonate, ether compounds such as 1,4-dioxane, and ketone compounds such as methyl ethyl ketone.

An organic salt is a salt in which at least one of the anion and the cation includes an organic substance. Examples of organic salts include trimethylamine maleate, triethylamine borodisalicylate, ethyldimethylamine phthalate, mono-1,2, 3,4-tetramethylimidazolinium phthalate, and mono-1,3-dimethyl-2-ethylimidazolinium phthalate.

The liquid component may contain an acid component (anion) and a base component (cation). A salt (solute) may be formed by the acid component and the base component. Examples of the acid component include organic carboxylic acids and inorganic acids. Examples of inorganic acids include phosphoric acid, boric acid, and sulfuric acid. Examples of the base component include primary to tertiary amine compounds.

Figure 3:
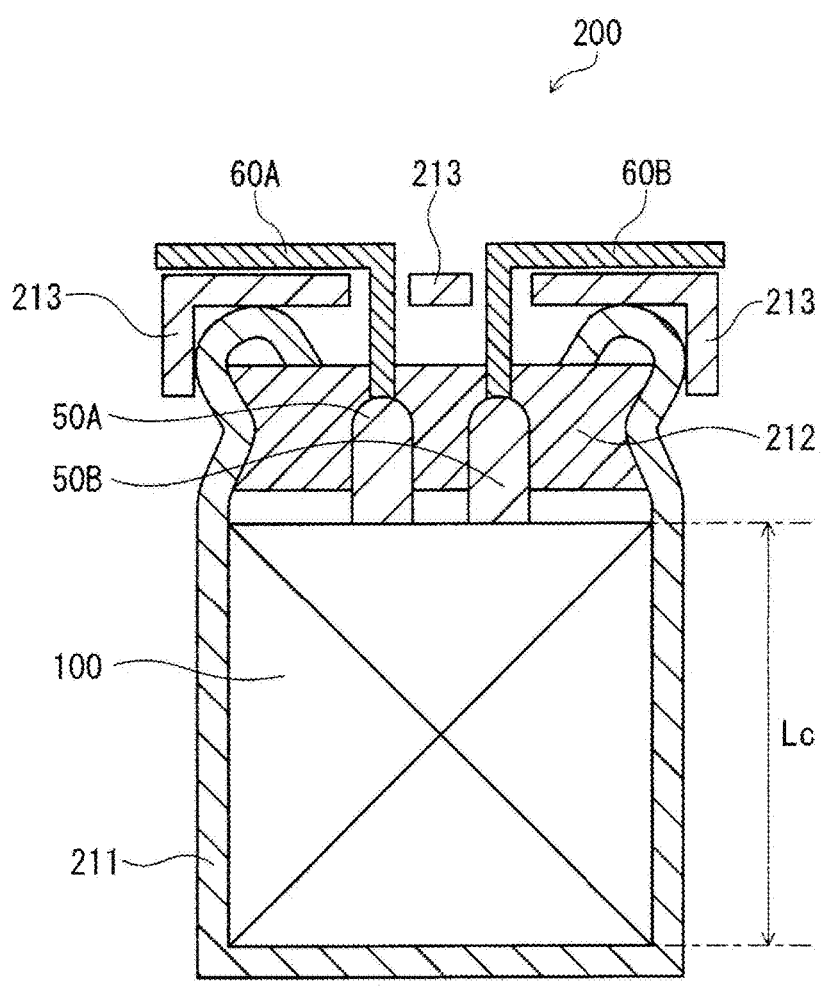
FIG. 3 A cross-sectional view schematically showing an electrolytic capacitor according to an embodiment of the present disclosure.
Figure 4:
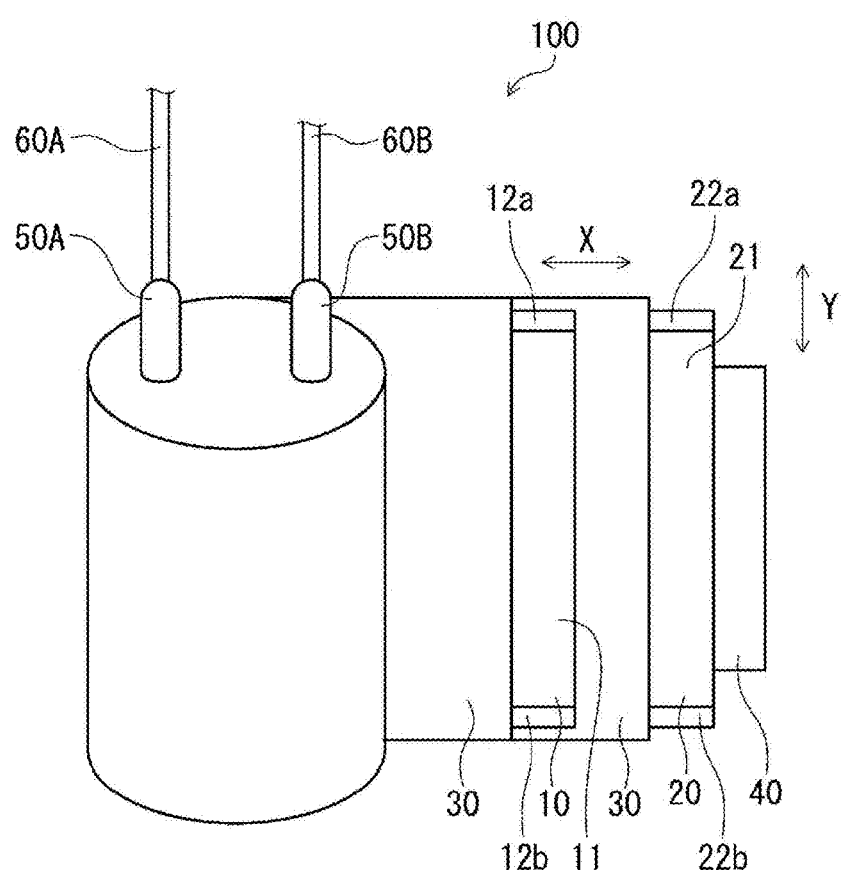
FIG. 4 A perspective view schematically showing a wound body.
Figure 5:
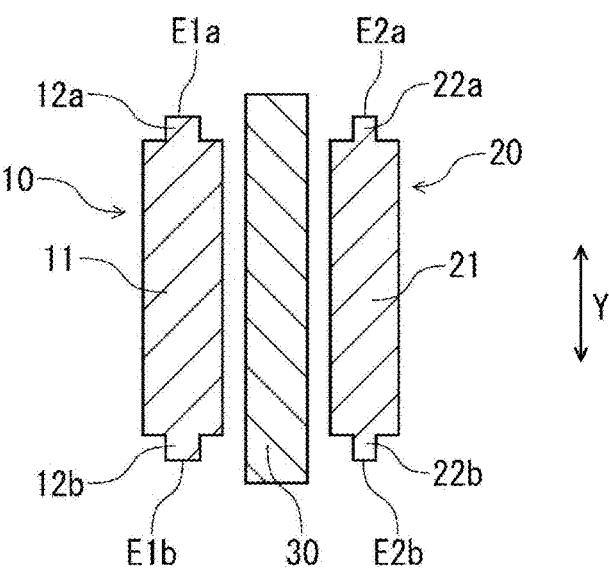
FIG. 5 A cross-sectional view schematically showing an anode foil, a cathode foil, and a separator that constitute a wound body.

Here, FIG. 3 is a cross-sectional view schematically showing an electrolytic capacitor according to an embodiment of the present disclosure. FIG. 4 is a perspective view schematically showing the configuration of the wound body shown in FIG. 3. In FIG. 4, the X-direction indicates the length direction of a band-shaped anode foil 10 and a band-shaped cathode foil 20, and the Y-direction indicates the width direction of the anode foil 10 and the cathode foil 20. FIG. 5 is a cross-sectional view schematically showing the configuration of the anode foil 10, the cathode foil 20, and a separator 30.

An electrolytic capacitor 200 includes a wound body 100. The wound body 100 is obtained by winding together the anode foil 10 and the cathode foil 20 with the separator 30 arranged therebetween. The wound body 100 has a height Lc. The direction of the height Lc can also be referred to as the Y-direction of the anode foil 10 and the cathode foil 20.

The band-shaped anode foil 10 has a first edge portion E1a extending in the length direction (the X-direction) thereof, and a second edge portion E1b that is opposite to the first edge portion E1a. The anode foil 10 has a first region 11, a 2A region 12a extending linearly along the first edge portion E1a, and a 2B region 12b extending linearly along the second edge portion E1b. The thickness of the 2A region 12a and the thickness of the 2B region 12b are each smaller than the thickness of the first region 11, and on both surfaces of the anode foil 10, a step is provided between the first region 11 and the 2A region 12a, and a step is provided between the first region 11 and the 2B region 12b.

The band-shaped cathode foil 20 has a first edge portion E2a extending in the length direction (the X-direction) thereof, and a second edge portion E2b that is opposite to the first edge portion E2a. The cathode foil 20 has a first region 21, a 2A region 22a extending linearly along the first edge portion E2a, and a 2B region 22b extending linearly along the second edge portion E2b. The thickness of the 2A region 22a and the thickness of the 2B region 22b are each smaller than the thickness of the first region 21, and on both surfaces of the cathode foil 20, a step is provided between the first region 21 and the 2A region 22a, and a step is provided between the first region 21 and the 2B region 22b.

The 2A region 12a and the 2B region 12b of the anode foil 10 and the 2A region 22a and the 2B region 22b of the cathode foil 20 ensure a long distance between the anode foil 10 and the cathode foil 20 at the first edge portion E1a and the second edge portion E1b of the anode foil 10 and at the first edge portion E2a and the second edge portion E2b of the cathode foil 20. This inhibits burrs present at edge portions of the anode foil and the cathode foil from breaking through the separator, and inhibits short circuit failure caused by burrs penetrating the separator.

The 2A region 12*a*, the 2B region 12*b*, the 2A region 22*a*, and the 2B region 22*b* ensure a distance that is longer than or equal to the thickness of the separator 30 between the edge portions E1*a* and E1*b* of the anode foil 10 and the edge portions E2*a* and E2*b* of the cathode foil 20 when forming the wound body 100. This can suppress an increase in leakage current and the occurrence of short circuit failure even when winding deviation or winding tightness occurs.

End portions of lead tabs 50A and 50B are respectively connected to the anode foil 10 and the cathode foil 20, and the wound body 100 is formed by winding the electrode foils to which the lead tabs 50A and 50B are connected. Lead wires 60A and 60B are respectively connected to the other end portions of the lead tabs 50A and 50B.

A winding end tape 40 is provided on the outer surface of a portion of the cathode foil 20 constituting the outermost layer of the wound body 100, and an end portion of the cathode foil 20 is fixed with the winding end tape 40. If the anode foil 10 is prepared by cutting a large foil, chemical conversion treatment may be further performed on the wound body 100 to provide a dielectric layer on the cut cross section.

The electrolyte is adhered to the wound body 100, and the electrolyte is interposed between the anode foil 10 (the dielectric layer) and the cathode foil. The surface of the anode foil 10 (the dielectric layer) can be covered with a conductive polymer by, for example, impregnating the wound body 100 with a treatment liquid containing the conductive polymer. Impregnation may be performed under a reduced pressure, for example, in an atmosphere of 10 kPa to 100 kPa. The wound body 100 is housed in a bottomed case 211 in such a manner that the lead wires 60A and 60B are located on the opening side of the bottomed case 211. The bottomed case 211 may be made of metal such as aluminum, stainless steel, copper, iron, or brass, or an alloy of any of these metals.

A sealing member 212 is arranged in the opening of the bottomed case 211 in which the wound body 100 is housed, the open end of the bottomed case 211 is swaged on the sealing member 212 to be curled, and a base plate 213 is arranged on the curled portion to seal the wound body 100 in the bottomed case 211.

The sealing member 212 is formed in such a manner that the lead wires 60A and 60B extend therethrough. The sealing member 212 is only required to be made of an insulating material, and is preferably constituted by an elastic member. In particular, it is preferable to use silicone rubber, fluororubber, ethylene propylene rubber, Hypalon rubber, butyl rubber, isoprene rubber, or the like, which has high heat resistance.

An electrolytic capacitor according to another embodiment of the present disclosure includes a stack in which a plurality of stacked capacitor elements are stacked. The capacitor elements each include: a metal foil having a cathode forming portion, an anode extraction portion extending from one edge portion of the cathode forming portion, and a porous portion on a surface of the metal foil: a dielectric layer covering the cathode forming portion; and a cathode portion covering the dielectric layer. The cathode forming portion is a linear region having a first region and a second region other than the first region, the second region extending along the other edge portion of the cathode forming portion other than the one edge portion, and the second region is thinner than the first region, and steps are provided between the first region and the second region on both surfaces of the metal foil.

The cathode portion includes, for example, a solid electrolyte layer covering the dielectric layer and a cathode extraction layer covering the solid electrolyte layer. In the stack, cathode portions (cathode extraction layers) of capacitor elements that are adjacent to each other may be in intimate contact with each other via an adhesive layer made of a conductive adhesive. In the stack, a stacked portion may be formed by stacking end portions of anode extraction portions of a plurality of capacitor elements.

Figure 6:
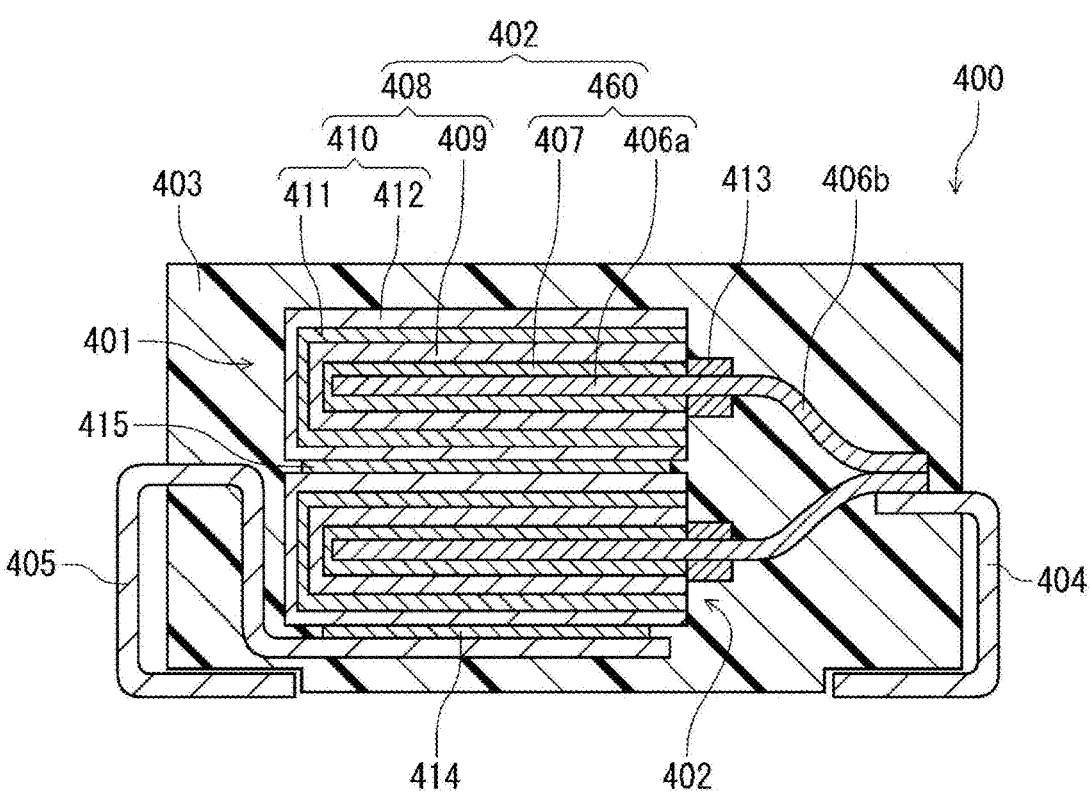
FIG. 6 A cross-sectional view schematically showing an electrolytic capacitor according to another embodiment of the present disclosure.
Figure 7:
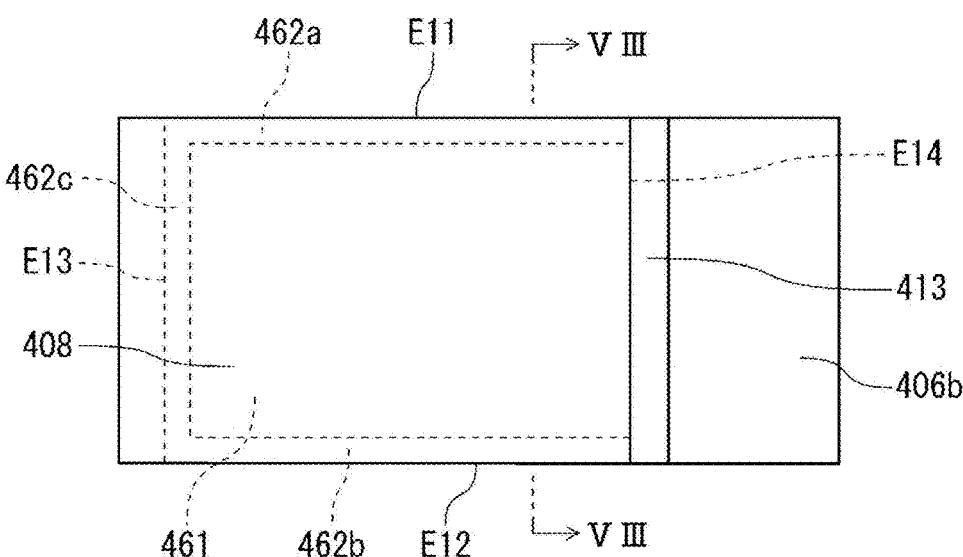
FIG. 7 An upper view schematically showing a stack.
Figure 8:
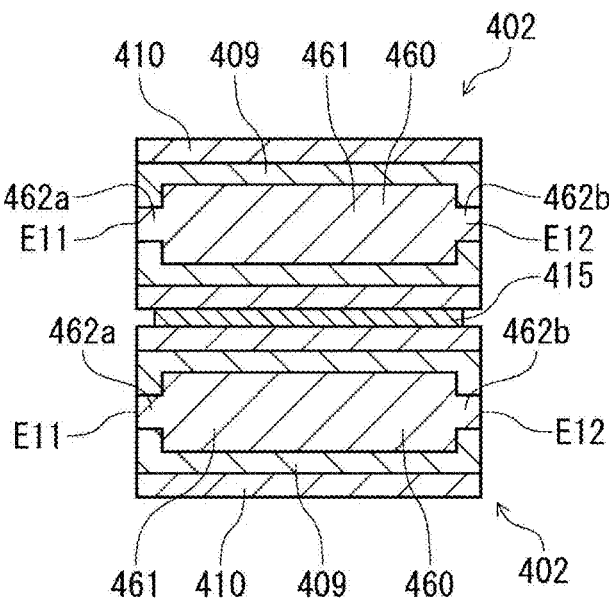
FIG. 8 A cross-sectional view taken along line VIII-VIII in FIG. 7.

Here, FIG. 6 is a cross-sectional view schematically showing an electrolytic capacitor according to another embodiment of the present disclosure. FIG. 7 is an upper view schematically showing a stack. For convenience, in a capacitor element 402, a first region 461 and a 2A region 462*a* to a 2C region 462*c* of an anode body 460 covered with a cathode portion 408 are shown in FIG. 7 using broken lines. FIG. 8 is a cross-sectional view taken along line VIII-VIII in FIG. 7.

An electrolytic capacitor 400 includes a stack 401, an anode lead terminal 404 and a cathode lead terminal 405 that are electrically connected to the stack 401, and a resin outer body 403 that seals the stack 401. Portions of the anode lead terminal 404 and the cathode lead terminal 405 are covered with the outer body 403. The outer body 403 has a substantially rectangular parallelepiped outer shape, and the electrolytic capacitor 400 also has a substantially rectangular parallelepiped outer shape.

The stack 401 is formed by stacking a plurality of capacitor elements 402. The capacitor elements 402 (cathode portions 408) that are adjacent to each other may be electrically connected to each other via an adhesive layer 415 made of a conductive adhesive. Although two capacitor elements are stacked in this embodiment, the number of capacitor elements that constitute a stack is not limited to this.

Each of the capacitor elements 402 includes: a metal foil 406 having a cathode forming portion 406*a* and an anode extraction portion 406*b* extending from one edge portion (fourth edge portion E14) of the cathode forming portion 406*a*; a dielectric layer 407 covering the cathode forming portion 406*a*; and a cathode portion 408 covering the dielectric layer 407. The metal foil 406 (the cathode forming portion 406*a* and the anode extraction portion 406*b*) has a porous portion on its surface, and the dielectric layer 407 is formed to cover the surface of the porous portion of the cathode forming portion 406*a*. The anode body 460 is constituted by the cathode forming portion 406*a* and the dielectric layer 407.

The anode body 460 (the cathode forming portion 406*a*) has a first edge portion E11 to a third edge portion E13. The edge portions E11 to E13 may be formed through cutting.

The anode body 460 has a first region 461, a 2A region 462*a* extending linearly along the first edge portion E11, a 2B region 462*b* extending linearly along the second edge portion E12, and a 2C region 462*c* extending linearly along the third edge portion E13. The 2A region 462*a* to the 2C region 462*c* are each thinner than the first region 461. Steps are provided between the first region 461 and the 2A region 462*a* to the 2C region 462*c* on both surfaces of the anode body 460 (the cathode forming portion 406*a*). The second region is formed by the 2A region 462*a* to the 2C region 462*c*.

When burrs (protruding portions) are present at an edge portion of the anode body having a dielectric layer on its surface, cathode portions (a solid electrolyte layer, a cathode extraction layer) will be formed at the burr portions in the process of forming a capacitor element. When a stack is formed by stacking a plurality of capacitor elements, capacitor elements that are adjacent to each other are adhered to each other using a conductive adhesive. Capacitor elements can be adhered to each other in a state in which the capacitor elements are in intimate contact with each other by applying a certain pressure to a stack. Thus, when forming a stack, pressure may be applied to a capacitor element having burrs. Also, pressure may be applied to a capacitor element having burrs when forming an outer body covering a stack through injection molding of a resin material, or when heat or vibration is transmitted to an electrolytic capacitor through a reflow process or the like. When pressure is applied to the capacitor element having burrs, a burr covered by the cathode portion may press an adjacent capacitor element (the dielectric layer), which may cause a defect in the dielectric layer and may increase leakage current. In some cases, a burr covered by the cathode portion may break through the dielectric layer of the adjacent capacitor element, causing the cathode portion and a metal base of the anode body to come into contact with each other, resulting in short circuit failure.

To address this, in this embodiment, a long distance between edge portions (the first edge portion E11 to the third edge portion E13) of the anode bodies 460 of capacitor elements 402 that are adjacent to each other in the stack 401 is ensured by providing the 2A region 462a to the 2C region 462c. As a result, even when burrs are present at the first edge portion E11 to the third edge portion E13, pressure applied by burrs to the adjacent capacitor element (the dielectric layer) is suppressed, and an increase in leakage current and the occurrence of short circuit failure can be suppressed.

An insulating separation layer 413 is formed in a part of the anode extraction portion 406b that is adjacent to the cathode portion 408, thus restricting contact between the cathode portion 408 and the anode body 460. End portions of the plurality of anode extraction portions 406b are stacked and collected into one, forming a stacked portion. The stacked portion of the plurality of anode extraction portions 406b and the anode lead terminal 404 are electrically connected to each other through welding. The cathode portion 408 of an end portion of the stack 401 and the cathode lead terminal 405 are electrically connected to each other via an adhesive layer 414 made of a conductive adhesive.

The cathode portion 408 includes a solid electrolyte layer 409 covering a dielectric layer 407 and a cathode extraction layer 410 covering the solid electrolyte layer 409. The cathode extraction layer 410 includes a carbon layer 411 and a silver paste layer 412.

The carbon layer 411 contains, for example, carbon particles and silver. The silver paste layer 412 contains, for example, silver particles and a binder. There is no particular limitation on the binder, and a product obtained by curing a curable resin is preferable. Examples of the curable resin include thermosetting resins such as epoxy resins.

The solid electrolyte layer 409 contains a conductive polymer, and may also contain a dopant as needed. It is possible to use, as the conductive polymer, polypyrrole, polythiophene, and polyaniline, and derivatives thereof. The solid electrolyte layer 409 can be formed by, for example, applying a treatment liquid containing a conductive polymer (a solution or dispersion containing a conductive polymer) to the surface of the anode body 460 having the first region and the second region, or impregnating the anode body 460 with the treatment liquid. The cathode portion may be formed by forming the solid electrolyte layer by applying the treatment liquid containing the conductive polymer only to the first region 461.

The outer body 403 preferably contains a product obtained by curing a curable resin composition, and may contain a thermoplastic resin or a composition containing the same. Examples of the curable resin include thermosetting resins such as epoxy resins.

[Method for Manufacturing Electrolytic Capacitor]

A method for manufacturing an electrolytic capacitor according to an embodiment of the present disclosure includes a first step, a second step (pressing step), and a third step (cutting step). In the first step, a metal base sheet having a plurality of first regions and a plurality of cutting regions alternately in stripes is prepared. In the second step, the cutting regions are compressed in the thickness direction of the metal base sheet. In the third step, a plurality of electrode foils are obtained by cutting central portions of cutting regions in their width direction along the length direction of the cutting regions. It is desirable that the width of the cutting region is smaller than the width of the first region. The metal base sheet may be a plain foil or an etched foil. The metal base sheet may be a sheet having a dielectric layer on its surface, or a sheet having a coating layer on its surface.

The metal base sheet prepared in the first step contains a valve action metal. In the first step, a metal base sheet having a dielectric layer on its surface may be prepared. In this case, the first step may include a step of forming a porous portion by roughening the surface of the metal base sheet. The first step may include a step of forming a dielectric layer covering the surface of the porous portion. In this case, the electrode foil obtained in the third step can be used as an anode foil.

In the second step, for example, a cutting region of the metal base sheet is roll pressed. In the second step, it is desirable that a plurality of cutting regions are roll pressed simultaneously. In the third step, it is desirable that a plurality of cutting regions are cut simultaneously. In the third step, for example, a plurality of band-shaped electrode foils are obtained by slitting a band-shaped metal base sheet having a width of 10 mm or more and 500 mm or less into a sheet having a width of 2 mm or more and 100 mm or less.

In the second step and the third step, for example, an apparatus, which is provided with a roll that conveys a metal base sheet, and a rolling roll and a slitting blade that are provided on a conveyance path, may be used. The rolling roll and the blade are respectively arranged on the upstream and the downstream sides of the conveyance path. A plurality of rolling rolls and a plurality of blades are arranged at certain intervals at positions corresponding to a plurality of cutting regions. In this case, a plurality of cutting regions can be subjected to pressing and slitting using a plurality of rolling rolls and a plurality of blades at once, pressing and slitting can be easily positioned, and the second step and the third step can be efficiently performed.

The manufacturing method may include a step of applying a treatment liquid containing a conductive polymer to the first region of the metal base sheet (a coating step). A conductive polymer layer (a solid electrolyte layer) covering the surface of the dielectric layer may be formed by performing a step of applying the treatment liquid containing the conductive polymer to the first region of the metal base sheet having the dielectric layer on its surface. The coating step may be preferably performed after the second step and before the third step, and may be performed before the second step. In the coating step, a coating method such as gravure coating is used. In the coating step, it is desirable that a plurality of first regions are coated simultaneously. In the coating step, the treatment liquid containing the conductive polymer does not need to be applied to the second region.

Figure 9:
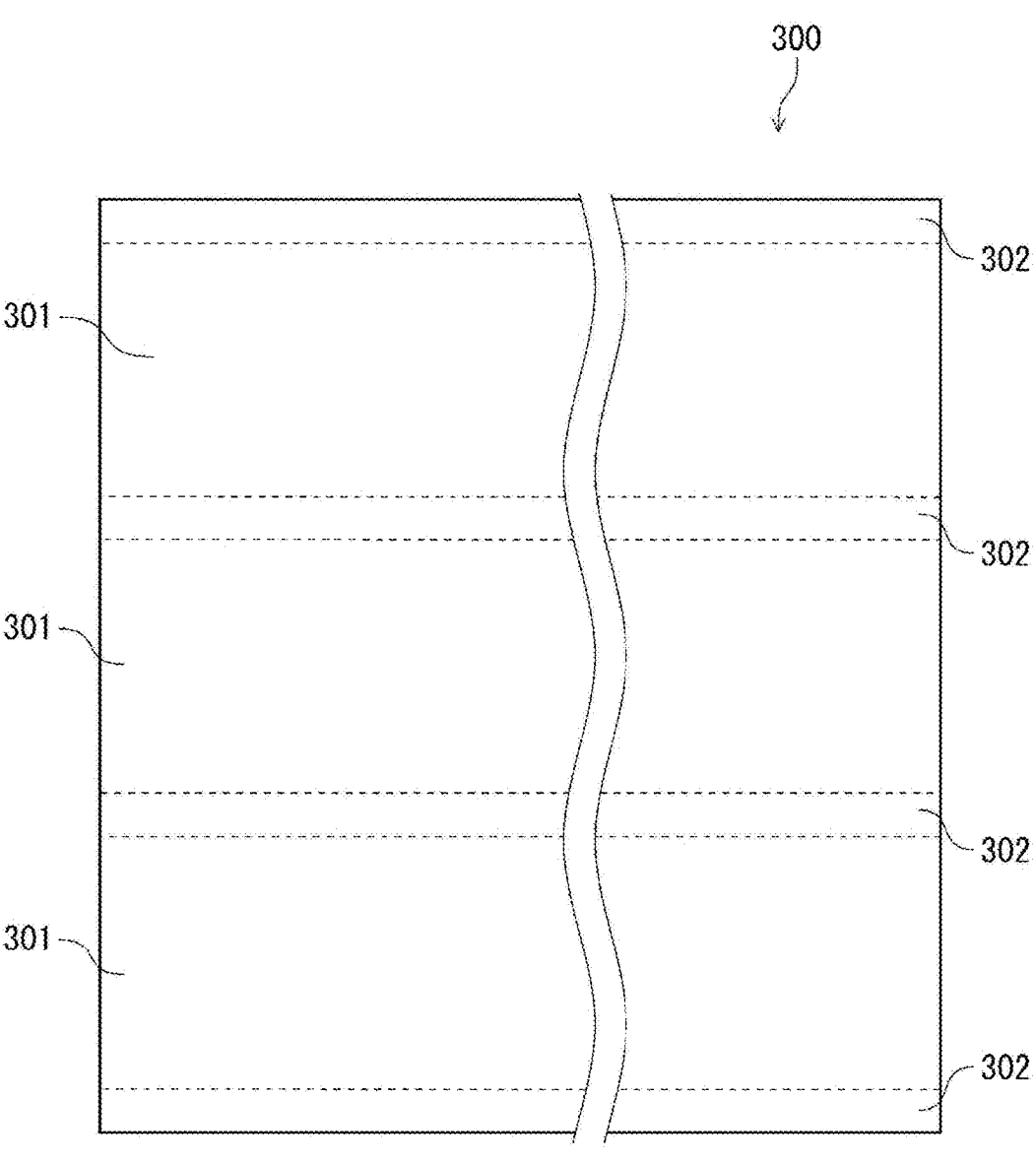
FIG. 9 A front view showing a metal base sheet prepared in a first step of a method for manufacturing an electrolytic capacitor according to one embodiment of the present disclosure.
Figure 10:
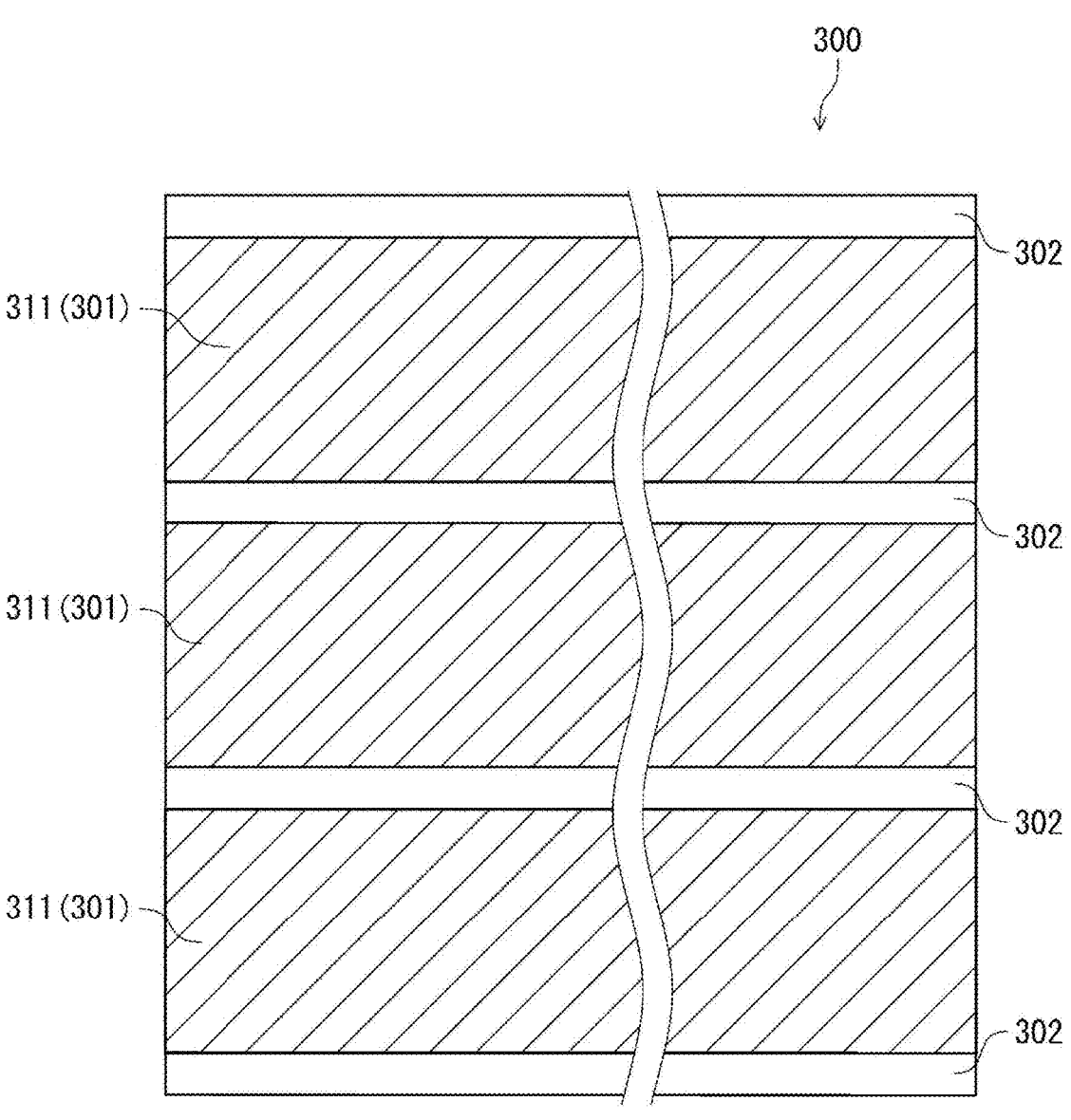
FIG. 10 A front view showing a metal base sheet in which a conductive polymer layer is formed on a surface of a first region in a coating step.
Figure 11:
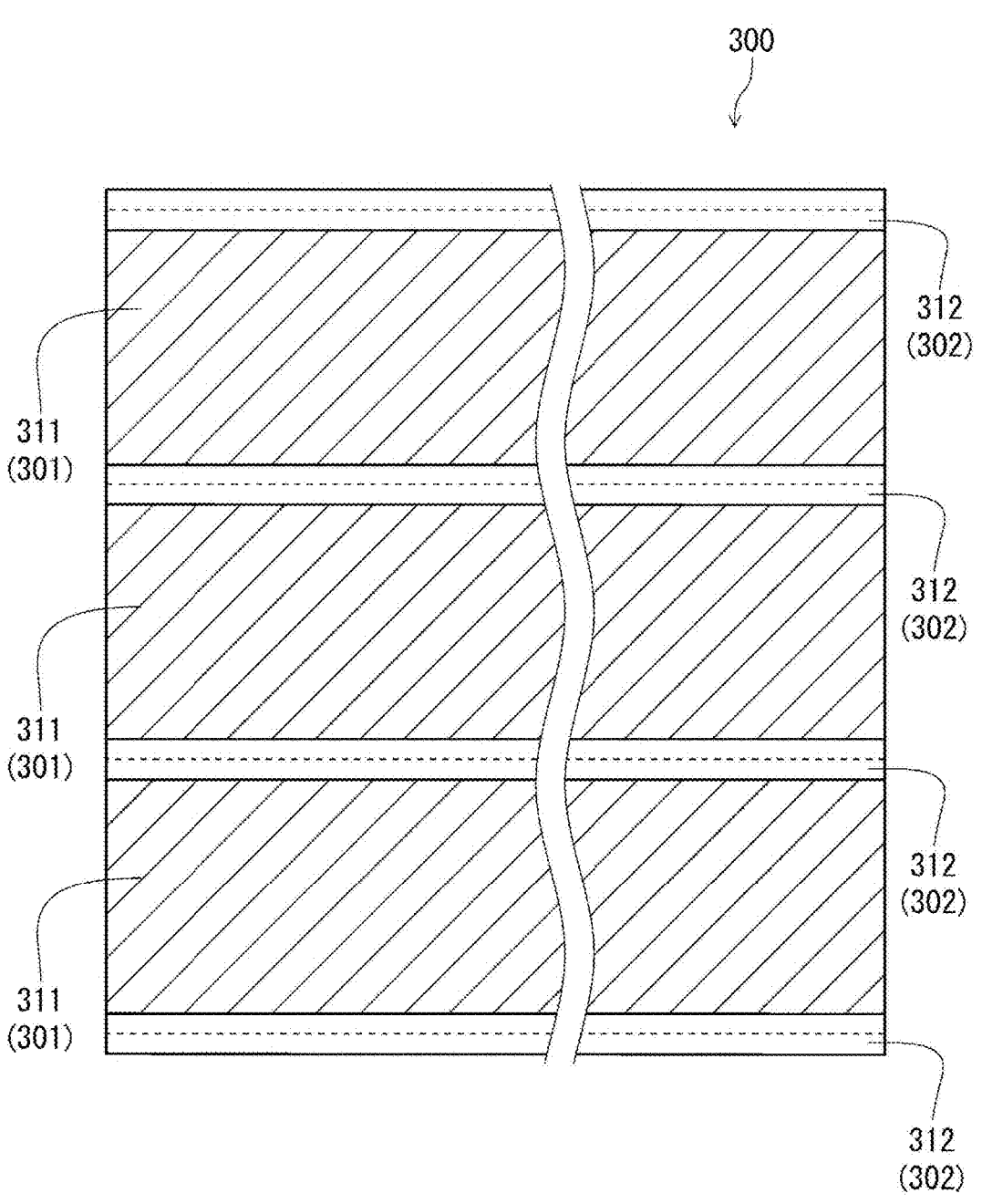
FIG. 11 A front view showing a metal base sheet in which cutting regions are compressed in a second step of a method for manufacturing an electrolytic capacitor according to an embodiment of the present disclosure.

Hereinafter, an example of the method for manufacturing an electrolytic capacitor according to an embodiment of the present disclosure (an example in which a plurality of band-shaped electrode foils are produced using the metal base sheet) will be described with reference to FIGS. 9 to 11. FIG. 9 is a front view showing the metal base sheet prepared in the first step. FIG. 10 is a front view showing the metal base sheet in which a conductive polymer layer is formed on the surface of the first region. FIG. 11 is a front view showing the metal base sheet whose cutting regions are compressed. Note that shaded portions in FIGS. 10 and 11 indicate regions where the conductive polymer layer has been formed.

A sheet 300 (a metal base sheet) shown in FIG. 9 has a plurality of first regions 301 and a plurality of cutting regions 302 alternately in stripes. The sheet 300 is provided with cutting regions 302 having the same width at certain intervals. The width of the cutting region 302 is smaller than the width of the first region 301.

Conductive polymer layers 311 shown in FIG. 10 are formed on the surfaces of the first regions 301 by applying the treatment liquid containing the conductive polymer to the first regions 301 and drying the sheet.

Compressed regions 312 shown in FIG. 11 are formed by roll pressing the cutting regions 302 in the sheet 300 in which the conductive polymer layers 311 are formed on the surfaces of the first regions 301. A plurality of band-shaped electrode foils having second regions are produced by cutting the central portions of compressed regions 312 (compressed cutting regions 302) in their width direction along the length direction of the regions (cutting along the broken lines in FIG. 11).

Furthermore, the manufacturing method may include a step of obtaining a wound body by winding together a band-shaped anode foil and a band-shaped cathode foil in the length direction of the anode foil and the cathode foil with a separator interposed between the anode foil and the cathode foil. The electrode foil obtained using the above manufacturing method (including the first step to the third step, and further including a coating step as needed) may be used as at least one of the anode foil and the cathode foil.

The manufacturing method may include a step of impregnating the wound body with the treatment liquid containing a conductive polymer. If the above coating step is not performed, it is desirable to perform the impregnating step on the wound body, and the above coating step may be performed and the impregnating step may be further performed on the wound body.

EXAMPLES

Although the present disclosure will be described below in more detail using Examples, the present disclosure is not limited to the examples.

Examples 1 to 6

A wound electrolytic capacitor (diameter 10 mm×height 10 mm) with a rated voltage of 25 V and a rated capacitance of 330 μF was produced in the following procedure.

(Production of Anode Foil)

A metal base sheet (with a thickness of 100 μm) having a plurality of first regions (with a width of 5.0 mm) and a plurality of cutting regions (with a width of 0.3 mm) alternately in stripes was prepared (the first step).

An etched foil having a dielectric layer on its surface was used as the metal base sheet. The etched foil was obtained by forming a porous portion (the thickness was 35 μm on each side, the most frequent pore diameter was 0.15 μm) on the surface of an Al foil having a thickness of 100 μm by etching the Al foil. The dielectric layer was obtained by forming an aluminum oxide layer (the thickness was 70 nm) through chemical conversion treatment performed on the etched foil.

A plurality of cutting regions were roll pressed (the second step). At this time, a press pressure (the thickness of the cutting region pressed) was adjusted such that the thickness T2 of later-described 2A regions and 2B regions had values shown in Table 1.

A plurality of band-shaped anode foils were obtained by cutting central portions of cutting regions in their width direction along the length direction of the cutting regions (the third step). Each anode foil had a first region (the thickness T1: 100 μm), a 2A region extending linearly along the first edge portion, and a 2B region extending linearly along the second edge portion. The thickness T2 of the 2A region and the 2B region had values shown in Table 1. The width of the first region (the length of the first region 1 shown in FIG. 1 in the Y-direction) was 5.0 mm. The width of the 2A region and the 2B region (the length of the 2A region 2a and the 2B region 2b shown in FIG. 1 in the Y-direction) was 0.15 mm.

(Preparation of Cathode Foil)

An etched foil having a chemical conversion coating on its surface was cut to a predetermined size, and the resulting foil was used as the cathode foil. The etched foil was obtained by forming a porous portion (the thickness was 15 μm on each side, the most frequent pore diameter was 0.12 μm) on the surface of an Al foil having a thickness of 50 μm by etching the Al foil. The chemical conversion coating was obtained by forming an aluminum oxide layer (the thickness was 5 nm) through chemical conversion treatment performed on the etched foil.

(Production of Wound Body)

An anode lead tab and a cathode lead tab to which lead wires were connected were respectively connected to the prepared anode foil and the prepared cathode foil. Then, the anode foil and the cathode foil were wound with a separator interposed therebetween, and an outer surface was fixed with winding end tape. A wound body was produced in this manner. A dielectric layer was formed on an end surface of the anode foil by performing chemical conversion treatment on the anode foil again.

(Production of Capacitor Element)

An aqueous dispersion (PEDOT: PSS dispersion) containing poly(3,4-ethylenedioxythiophene) doped with polystyrene sulfonic acid (PSS) was prepared. The wound body was immersed in the PEDOT: PSS dispersion in a container in a reduced pressure atmosphere (40 kPa) at room temperature, and then dried in an atmospheric pressure atmosphere at 120° C. A capacitor element was obtained by adhering the conductive polymer to the wound body in this manner.

(Impregnation with Electrolyte Solution)

The capacitor element was housed in a bottomed case, and the capacitor element was impregnated with an electrolyte solution at room temperature in an atmospheric pressure atmosphere. An electrolyte solution containing, as a main component, a product obtained by dissolving triethylamine phthalate in ethylene glycol was used.

(Sealing of Capacitor Element)

A sealing member and a base plate were arranged on an opening of the bottomed case to seal the capacitor element. An electrolytic capacitor was completed in this manner. Then, aging treatment was performed at 105° C. for 2 hours while applying the rated voltage. Note that A1 to A6 in Table 1 respectively indicate electrolytic capacitors of Examples 1 to 6.

Comparative Example 1

An electrolytic capacitor B1 was produced in the same manner as in Example 1, except that the third step (cutting step) was performed without performing the second step (pressing step) in the production of an anode foil.

Each electrolytic capacitor was evaluated as follows.

[Evaluation 1: Measurement of Initial LC Defect Ratio]

A leakage current was measured 120 seconds after the rated voltage was applied to an electrolytic capacitor. At that time, it was determined that an electrolytic capacitor having a leakage current value of more than 0.01 CV (82.5 μA) was defective. The ratio of the number of defective products to the number of measured electrolytic capacitors was determined as the LC defect ratio.

[Evaluation 2: Measurement of Leakage Current after Vibration Test (Vibration Resistance Evaluation)]

The base plate of an electrolytic capacitor was fixed to a vibration plate, and a vibration test was performed. In the vibration test, sinusoidal vibration (frequency was 5 to 2000 Hz, maximum amplitude was 5 mm, amplitude acceleration was 294 m/s2) was applied to the vibration plate. Vibration was applied for 2 hours in the axial direction of the electrolytic capacitor (the direction of the height Lc of the wound body 100 shown in FIG. 3) and two directions perpendicular to the axial direction (any one direction and directions perpendicular to the one direction). After the vibration test was performed, a leakage current was measured using the same method as in Evaluation 1.

The evaluation results are shown in Table 1.

TABLE 1

| | Anode Foil | | | Evaluation | |
| --- | --- | --- | --- | --- | --- |
| Electrolytic Capacitor | Thickness T1 (μm) | Thickness T2 (μm) | Thickness Ratio T2/T1 | Leakage Current after Vibration Test (μA) | Initial LC Defect Ratio (%) |
| A1 | 100 | 50 | 0.50 | 3.2 | 2.3 |
| A2 | 100 | 60 | 0.60 | 3.4 | 2.2 |
| A3 | 100 | 75 | 0.75 | 3.4 | 2.4 |
| A4 | 100 | 85 | 0.85 | 3.5 | 2.6 |
| A5 | 100 | 95 | 0.95 | 4.0 | 3.1 |
| A6 | 100 | 98 | 0.98 | 4.4 | 4.1 |
| B1 | — | — | — | 8.8 | 6.8 |

The electrolytic capacitors A1 to A6 had a long distance between edge portions of the anode foil and the cathode foil, and damage to the separators due to burrs present at the edge portions of the electrode foils was suppressed. As a result, the initial LC defect ratio was low, and the leakage current after vibration was also weak. In the electrolytic capacitor B1, the initial LC defect ratio increased due to burrs present at the edge portions of the electrode foils, and the leakage current increased after vibration.

Examples 7 to 12

(Preparation of Anode Foil)

An etched foil having a dielectric layer on its surface was cut to a predetermined size, and the resulting foil was used as the anode foil. The etched foil was obtained by forming a porous portion (the thickness was 35 μm on each side, the most frequent pore diameter was 0.15 μm) on the surface of an Al foil having a thickness of 100 μm by etching the Al foil. The dielectric layer was obtained by forming an aluminum oxide layer (the thickness was 70 nm) through chemical conversion treatment performed on the etched foil.

(Production of Cathode Foil)

A metal base sheet having a plurality of first regions (with a thickness of 50 μm and a width of 5.0 mm) and a plurality of cutting regions (with a thickness of 50 μm and a width of 0.3 mm) alternately in stripes was prepared (the first step).

An etched foil having a chemical conversion coating on its surface was used as the metal base sheet. The etched foil was obtained by forming a porous portion (the thickness was 15 μm on each side, the most frequent pore diameter was 0.12 μm) on the surface of an Al foil having a thickness of 50 μm by etching the Al foil. The chemical conversion coating was obtained by forming an aluminum oxide layer (the thickness was 5 nm) through chemical conversion treatment performed on the etched foil.

A plurality of cutting regions were roll pressed (the second step). At this time, a press pressure (the thickness of the cutting region pressed) was adjusted such that the thickness T2 of later-described 2A regions and 2B regions had values shown in Table 2.

A plurality of band-shaped cathode foils were obtained by cutting central portions of cutting regions in their width direction along the length direction of the cutting regions (the third step). Each cathode foil had a first region (the thickness T1: 50 μm) and a 2A region extending linearly along the first edge portion, and a 2B region extending linearly along the second edge portion. The thickness T2 of the 2A region and the 2B region had values shown in Table 1. The width of the first region (the length of the first region 1 shown in FIG. 1 in the Y-direction) was 5.0 mm. The width of the 2A region and the 2B region (the length of the 2A region 2*a* and the 2B region 2*b* shown in FIG. 1 in the Y-direction) was 0.15 mm.

Electrolytic capacitors A7 to A12 were produced in the same manner as in Example 1, except that the anode foil prepared above and the cathode foil obtained above were used.

Evaluation 1 and Evaluation 2 above were conducted for the electrolytic capacitors A7 to A12. The evaluation results are shown in Table 2. Table 2 also shows the results of evaluating the electrolytic capacitor B1.

TABLE 2

| Electrolytic Capacitor | Cathode Foil | | | Evaluation | |
|---|---|---|---|---|---|
| | Thickness T1 (μm) | Thickness T2 (μm) | Thickness Ratio T2/T1 | Leakage Current after Vibration Test (μA) | Initial LC Defect Ratio (%) |
| A7 | 50 | 25 | 0.50 | 4.4 | 2.9 |
| A8 | 50 | 30 | 0.60 | 4.8 | 3.1 |
| A9 | 50 | 37.5 | 0.75 | 4.8 | 3.5 |
| A10 | 50 | 42.5 | 0.85 | 5.1 | 3.6 |
| A11 | 50 | 47.5 | 0.95 | 5.2 | 5.0 |
| A12 | 50 | 49 | 0.98 | 6.7 | 5.9 |
| B1 | — | — | — | 8.8 | 6.8 |

The electrolytic capacitors A7 to A12 had a long distance between edge portions of the anode foil and the cathode foil, and damage to the separators due to burrs present at the edge portions of the electrode foils was suppressed. As a result, the electrolytic capacitors A7 to A12 had a lower initial LC defect ratio, and also had a weaker leakage current after vibration, compared to the electrolytic capacitor B1.

INDUSTRIAL APPLICABILITY

An electrode foil according to the present disclosure is suitably used for an electrolytic capacitor for which high reliability is required.

Although the present invention has been described in terms of the presently preferred embodiments, it is to be understood that such a disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: first region, 2a: 2A region, 2b: 2B region, E1: first edge portion, E2: second edge portion, 3: electrode foil, 10: anode foil, 11: first region of anode foil, 12a: 2A region of anode foil, 12b: 2B region of anode foil, Ela: first edge portion of anode foil, E1b: second edge portion of anode foil, 20: cathode foil, 21: first region of cathode foil, 22a: 2A region of cathode foil, 22b: 2B region of cathode foil, E2a: first edge portion of cathode foil, E2b: second edge portion of cathode foil, 30: separator, 40: winding end tape, 50A, 50B: lead tab, 60A, 60B: lead wire, 100: wound body, 200: wound electrolytic capacitor, 211: bottomed case, 212: sealing member, 213: base plate, 300: metal base sheet, 301: first region, 302: cutting region, 311: conductive polymer layer, 312: compressed region, 400: stacked-type electrolytic capacitor, 401: stack, 402: capacitor element, 403: outer body, 404: anode lead terminal, 405: cathode lead terminal, 406: metal foil, 406a: cathode forming portion, 406b: anode extraction portion, 407: dielectric layer, 408: cathode portion, 409: solid electrolyte layer, 410: cathode extraction layer, 411: carbon layer, 412: silver paste layer, 413: separation layer, 414: adhesive layer, 460: anode body, 461: first region of anode body, 462a: 2A region of anode body, 462b: 2B region of anode body, 462c: 2C region of anode body, E11: first edge portion of anode body, E12: second edge portion of anode body, E13: third edge portion of anode body, E14: fourth edge portion of anode body.

The invention claimed is:

1. An electrode foil for an electrolytic capacitor, comprising
   a metal foil having a first region and a second region other than the first region,
   wherein the second region is a region extending linearly along an edge portion of the metal foil,
   the thickness of the second region is smaller than the thickness of the first region,
   steps are provided between the first region and the second region on both surfaces of the metal foil,
   the metal foil includes porous portions on surfaces of the first region and the second region, the electrode foil further includes a dielectric layer covering a surface of the porous portions, and
   a ratio of a most frequent pore diameter P2 of the porous portion in the second region to a most frequent pore diameter P1 of the porous portion in the first region: P2/P1 is 0.3 or more and 0.8 or less.
2. The electrode foil for an electrolytic capacitor according to claim 1,
   wherein the metal foil is band-shaped,
   the edge portion includes a first edge portion extending in a length direction of the metal foil and a second edge portion that is opposite to the first edge portion, and
   the second region is at least one of a 2A region extending linearly along the first edge portion and a 2B region extending linearly along the second edge portion.
3. The electrode foil for an electrolytic capacitor according to claim 1,
   wherein a ratio of a thickness T2 of the second region to a thickness T1 of the first region: T2/T1 is 0.60 or more and 0.95 or less.
4. The electrode foil for an electrolytic capacitor according to claim 1, further comprising
   a coating layer covering surfaces of the first region and the second region,
   wherein the coating layer includes at least one selected from the group consisting of a metal oxide layer, a metal nitride layer, a metal carbide layer, and a conductive layer.
5. An electrolytic capacitor comprising
   a wound capacitor element,
   wherein the capacitor element includes a wound body obtained by winding together a band-shaped anode foil, a band-shaped cathode foil, and a separator arranged between the anode foil and the cathode foil,
   at least one of the anode foil and the cathode foil includes a band-shaped metal foil having a first region and a second region other than the first region,
   the metal foil includes a first edge portion extending in a length direction of the metal foil and a second edge portion that is opposite to the first edge portion,
   the second region is at least one of a 2A region extending linearly along the first edge portion and a 2B region extending linearly along the second edge portion,
   the thickness of the second region is smaller than the thickness of the first region,
   steps are provided between the first region and the second region on both surfaces of the metal foil,
   the anode foil includes the metal foil having porous portions on surfaces of the first region and the second region, and a dielectric layer covering a surface of the porous portions, and
   a ratio of a most frequent pore diameter P2 of the porous portion in the second region to a most frequent pore diameter P1 of the porous portion in the first region: P2/P1 is 0.3 or more and 0.8 or less.
6. The electrolytic capacitor according to claim 5, comprising a conductive polymer covering the dielectric layer.
7. The electrolytic capacitor according to claim 6,
   wherein a coverage of inner walls of pits in the porous portion with the conductive polymer in the second region is smaller than that in the first region.
8. An electrolytic capacitor comprising
   a stack in which a plurality of stacked capacitor elements are stacked, wherein the capacitor elements each include:

a metal foil having a cathode forming portion, an anode extraction portion extending from one edge portion of the cathode forming portion, and a porous portion on a surface of the metal foil;

a dielectric layer covering the cathode forming portion; and a cathode portion covering the dielectric layer, the cathode forming portion includes a first region and a second region other than the first region, the second region is a region extending linearly along another edge portion of the cathode forming portion other than the one edge portion, the thickness of the second region is smaller than the thickness of the first region, steps are provided between the first region and the second region on both surfaces of the metal foil, and a ratio of a most frequent pore diameter P2 of the porous portion in the second region to a most frequent pore diameter P1 of the porous portion in the first region: P2/P1 is 0.3 or more and 0.8 or less.

9. The electrolytic capacitor according to claim 8, wherein the cathode portion includes a solid electrolyte layer covering the dielectric layer, and a cathode extraction layer covering the solid electrolyte layer.

10. A method for manufacturing an electrolytic capacitor, comprising:

a first step of preparing a metal base sheet having a plurality of first regions and a plurality of cutting regions alternately in stripes;

a second step of compressing the cutting regions in a thickness direction of the metal base sheet to form a plurality of second regions; and a third step of obtaining a plurality of electrode foils by cutting central portions of the cutting regions in a width direction of the cutting regions, along a length direction of the cutting regions such that each of the plurality of electrode foils has the first region and the second region, wherein the first step includes a step of forming a porous portion by roughening a surface of the metal base sheet, the first region is band-shaped, the first step includes a step of forming a dielectric layer covering a surface of the porous portion, a band-shaped anode foil is obtained as the electrode foil in the third step, and a ratio of a most frequent pore diameter P2 of the porous portion in the second region to a most frequent pore diameter P1 of the porous portion in the first region: P2/P1 is 0.3 or more and 0.8 or less.

11. The method for manufacturing an electrolytic capacitor according to claim 10, further comprising a step of applying a treatment liquid containing a conductive polymer to the first region of the metal base sheet.

12. The method for manufacturing an electrolytic capacitor according to claim 10, further comprising a step of obtaining a wound body by winding together the band-shaped anode foil and the band-shaped cathode foil in the length direction of the anode foil and the cathode foil with a separator interposed between the anode foil and the cathode foil.

13. The method for manufacturing an electrolytic capacitor according to claim 12, further comprising a step of impregnating the wound body with a treatment liquid containing the conductive polymer.

\* \* \* \* \*